March 23, 1937.  H. R. GUEST  2,074,959
FUEL TANK GAUGE
Filed Sept. 10, 1936  2 Sheets-Sheet 2
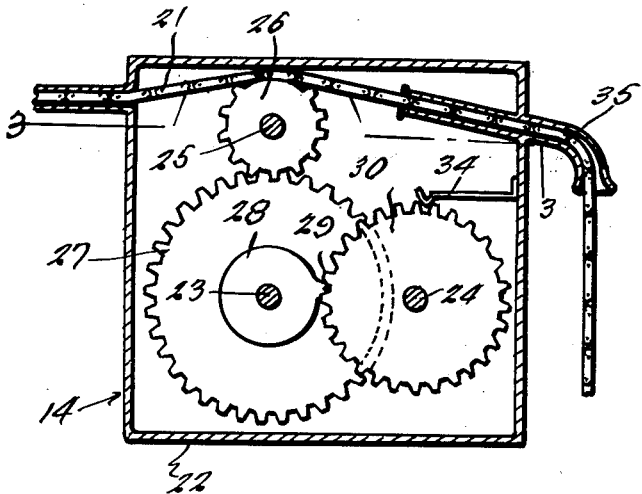
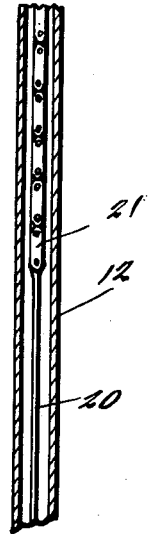
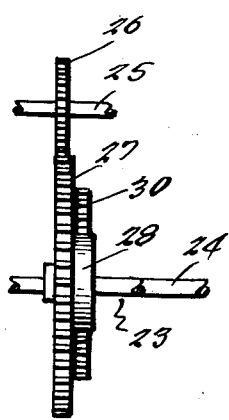
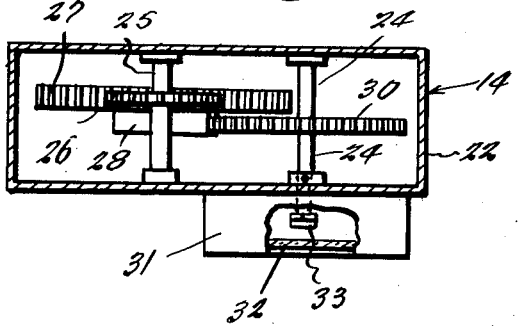
Inventor
H. R. Guest
By Clarence A. O'Brien
Hyman Berman
Attorneys Patented Mar. 23, 1937

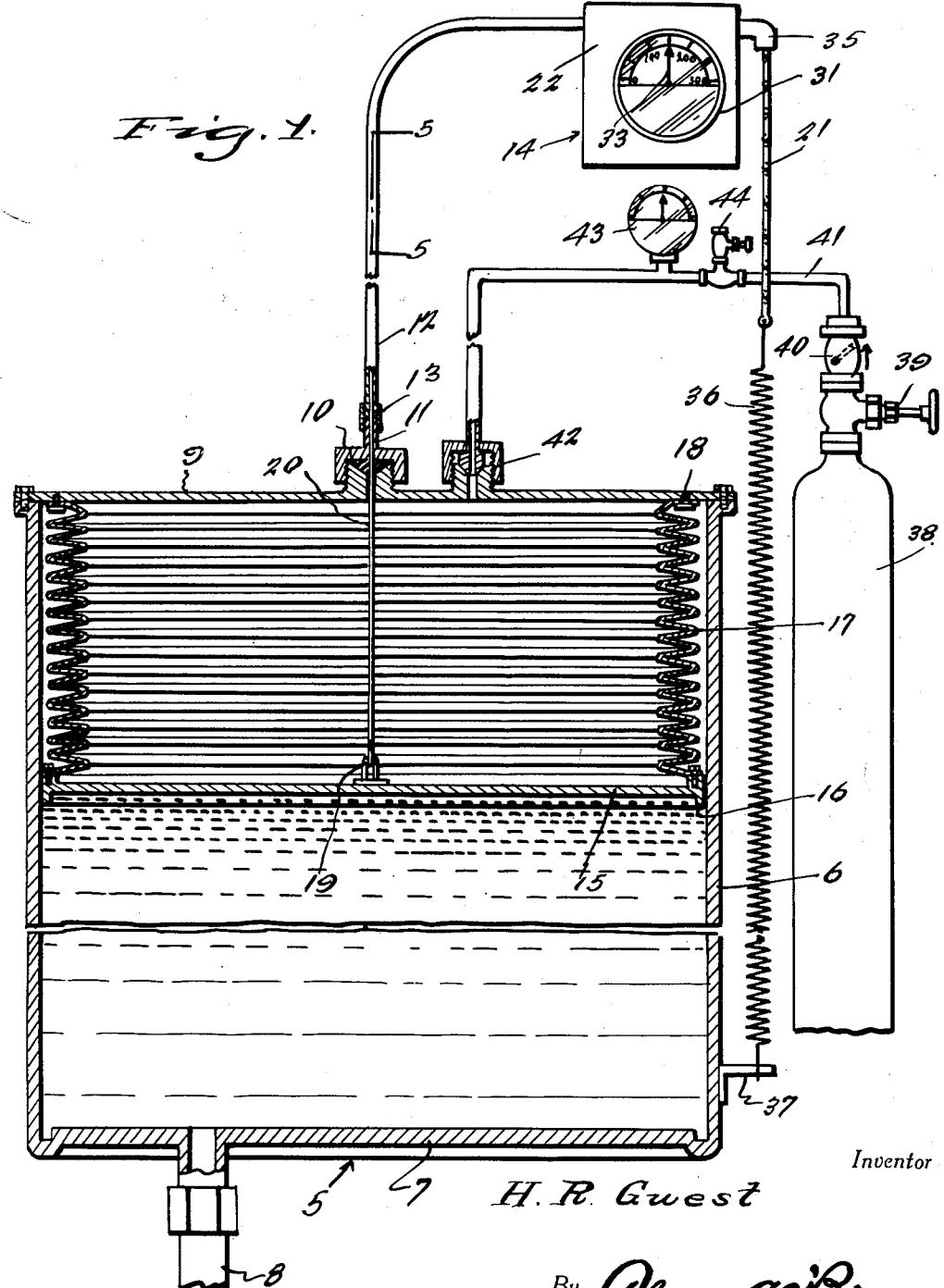

2,074,959

UNITED STATES PATENT OFFICE 2,074,959

FUEL TANK GAUGE

Herbert Rainford Guest, Habana, Cuba

Application September 10, 1936, Serial No. 100,206

2 Claims. (Cl. 73—82)

This invention appertains to new and useful improvements in tanks for gasolene and other liquid fuel.

The principal object of the present invention is to provide a fuel tank equipped with a gauge whereby the contents of the tank are constantly under measurement regardless of the position of the tank, as when the tank is being employed on aeroplanes and the tank is not always on the horizontal.

Another important object of the invention is to provide liquid fuel gauge means for fuel tanks wherein a follower is employed in conjunction with the gauge and maintained tensionally against the volume of fuel in the tank.

Other important objects and advantages of the invention will become apparent to the reader of the following specification.

In the drawings:

Figure 1 represents a vertical sectional view through the tank.

Figure 2 is a vertical sectional view through the gauge unit.

Figure 3 is a horizontal section on line 3—3 of Figure 2.

Figure 4 is a fragmentary side elevational view of the gear train of the gauge.

Figure 5 is an enlarged sectional view taken substantially on line 5—5 of Figure 1.

Referring to the drawings, wherein like numerals designate like parts, it can be seen that numeral 5 generally refers to the tank which consists of the receptacle 6 having the bottom wall 7 into which the supply line 8 connects. The receptacle 6 is provided with the removable top 9. The top 9 is provided with a packing gland 10 from which rises the tube 11. An elongated conduit 12 is connected to the tube 11 by the coupling 13 and this conduit 12 extends to the gauge generally referred to by numeral 14.

A follower 15 in the receptacle 6 is provided with a peripheral flange 16 to which the lower end of the bellows 17 is attached. The upper end of the bellows is connected as at 18 to the under side of the top 9. An eye member 19 on the top side of the follower 15 has the cable 20 attached thereto and this cable extends upwardly through the packing gland 10 and into the conduit 12 where it attaches to the sprocket chain 21.

Now referring to Figure 2, it can be seen that the gauge 14 consists of the casing 22 in which are the shafts 23, 24, and 25. The chain 21 passes over the sprocket wheel 26 and the sprocket wheel 26 in turn meshes with the large gear 27 on the shaft 23. Secured to the gear 27 is the disk 28 having the single cog 29 thereon meshing with the gear 30 on the shaft 24. A small box 31 on the front side of the casing 22 has the window 32 therein and a suitable dial in front of which the pointer 33 operates, the pointer 33 being located on the shaft 24. A spring detent 34 projecting from one wall of the casing 22 engages with the cog of the gear 30.

The chain 21 passes through the casing 22 and through the chute 35 to extend downwardly as shown in Figure 1 to connect to the upper end of the coiled extensible spring 36 which at its lower end is attached to the bracket 37 on the lower portion of the receptacle 6.

Numeral 38 represents a compressed air tank having the valve 39 in the neck thereof in addition to the check valve 40. From the upper end of the tank 38 extends the conduit 41 to the fitting 42 on the top 9 of the tank 5. The conduit 41 has the pressure gauge 43 communicating therewith as well as the relief valve 44.

It can now be seen that when the tank is filled and the valve 39 open, the follower plate 15 will be held down under pressure against the fuel so that the fuel will be accurately gauged or measured at all times. As the follower plate 15 descends, the cable 20 will be pulled and the chain 21 in riding over the cog 26 will cause the gear in the gauge to operate with the result that as the fuel is used and while it is kept under pressure, the indication of the volume remaining is given by the gauge.

When the tank is to be refilled, the relief valve 44 is opened so that air can escape from the bellows. Of course at this time the valve 39 is kept closed. Thus pressure on the interior of the fuel tank is relieved so that the same can be refilled.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. A fuel tank comprising a receptacle having a top, a follower plate in the tank, an airtight bellows connecting the follower plate with the under side of the top, a gauge, a member extending from the follower plate to the gauge, said top being provided with a packing gland therein through which the said member extends and means for maintaining fluid pressure in the bellows.

2. A fuel tank comprising a receptacle having a top, a follower plate in the tank, a bellows connected between the follower plate and the under side of the top, a gauge, a member extending from the follower plate to the gauge, and a fluid pressure source communicating with the interior of the bellows.

HERBERT RAINFORD GUEST.